(12) United States Patent  
Knierim et al.

(10) Patent No.: US 7,556,326 B2  
(45) Date of Patent: Jul. 7, 2009

(54) INK LEVEL SENSOR AND METHOD OF USE

(75) Inventors: David L. Knierim, Wilsonville, OR (US); Ivan McCracken, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 361 days.

(21) Appl. No.: 11/241,322

(22) Filed: Sep. 30, 2005

(65) Prior Publication Data

US 2007/0076023 A1    Apr. 5, 2007

(51) Int. Cl.
- *B41J 2/195* (2006.01)
- *B41J 29/38* (2006.01)
- *B41J 25/308* (2006.01)
- *B41J 29/393* (2006.01)
- *G01F 23/00* (2006.01)
- *G01F 23/24* (2006.01)

(52) U.S. Cl. ............... 347/7; 347/9; 347/8; 347/19; 73/304 R

(58) Field of Classification Search ........ 347/7–9, 347/19; 73/304 R
See application file for complete search history.

(56) References Cited

U.S. PATENT DOCUMENTS

| | | | | |
|---|---|---|---|---|
| 5,291,121 | A * | 3/1994 | Neale et al. | 323/313 |
| 5,742,308 | A * | 4/1998 | Cowger et al. | 347/85 |
| 6,318,826 | B1 * | 11/2001 | Froger et al. | 347/7 |
| 6,929,343 | B2 * | 8/2005 | Farr et al. | 347/19 |
| 2005/0140742 | A1 * | 6/2005 | Nakamura | 347/68 |
| 2005/0243111 | A1 * | 11/2005 | Eguchi et al. | 347/7 |

* cited by examiner

*Primary Examiner*—Julian D Huffman  
*Assistant Examiner*—Jason S Uhlenhake  
(74) *Attorney, Agent, or Firm*—Marger Johnson & McCollom, P.C.

(57) ABSTRACT

An ink level sensing system and method of sensing that includes a lower probe positioned in a lower portion of an ink reservoir, an upper probe positioned above the lower probe and extending upward to an upper portion of the ink reservoir, and an electrode positioned next to the lower and upper probes. An electrical signal is driven to the electrode and current flows are detected from the electrode to the lower and upper probes. The current flows to the lower and upper probes are compared to determine a level of ink in the ink reservoir.

17 Claims, 8 Drawing Sheets

INK LEVEL SENSOR AND METHOD OF USE

BACKGROUND OF THE DISCLOSURE

Several methods are currently used to determine the height of ink in the ink supply reservoirs in printers such as solid ink jet printers. The word "printer" as used herein encompasses any apparatus, such as digital copier, bookmaking machine, facsimile machine, multi-function machine, etc. which performs a print outputting function for any purpose. Examples of the methods include: (1) conductive level sense probe; (2) over-driven thermistor; and (3) vibrating beam.

The conductive level sense probe involves a single-point method of determining if the reservoir is full. When the height of the ink rises to a level touching the probe, an electrical current can pass from the probe through the ink to ground, thereby registering that the ink is at the height of the probe tip.

The over-driven thermistor also involves a single-point method of determining ink height. When the thermistor is covered by ink, the thermistor is quenched to a lower temperature. This causes the thermistor to send a different resistance reading to a controller indicating that the ink is at the height of the thermistor.

The vibrating beam or "twanger" is a form of continuous ink level sensing. The resonance of the beam changes as a function of the amount of the beam immersed in ink (i.e., the ink level).

SUMMARY OF THE DISCLOSURE

An embodiment is an ink reservoir level sensing apparatus. The apparatus includes a lower probe positioned to be inserted in a lower portion of an ink reservoir and an upper probe arranged above the lower probe. The upper probe is shaped to extend to an upper portion of the ink reservoir. The apparatus further includes an electrode arranged adjacent to the upper and lower probes. The apparatus further includes a controller adapted to drive an AC signal to the electrode and to detect a current flow from the electrode to the upper and lower probes.

Another embodiment is an ink reservoir level sensing system that includes an ink reservoir, a means for measuring a first conductivity of ink in a bottom portion of the reservoir, a means for measuring a second conductivity of ink in the reservoir, and a means for comparing the first and second conductivities of the ink to determine an amount of ink in the reservoir. The second conductivity varies continuously relative to a level of ink in the reservoir.

Another embodiment is a method of sensing a level of ink in a reservoir that includes positioning a lower probe in a lower portion of the reservoir, positioning an upper probe in the reservoir above the lower probe extending to an upper portion of the reservoir, and positioning an electrode in the reservoir next to the lower and upper probes. The method further includes driving an AC signal to the electrode, detecting current flows from the electrode to the lower and upper probes, and determining a level of ink in the reservoir by comparing the current flows to the lower and upper probes.

DETAILED DESCRIPTION

Figure 1:
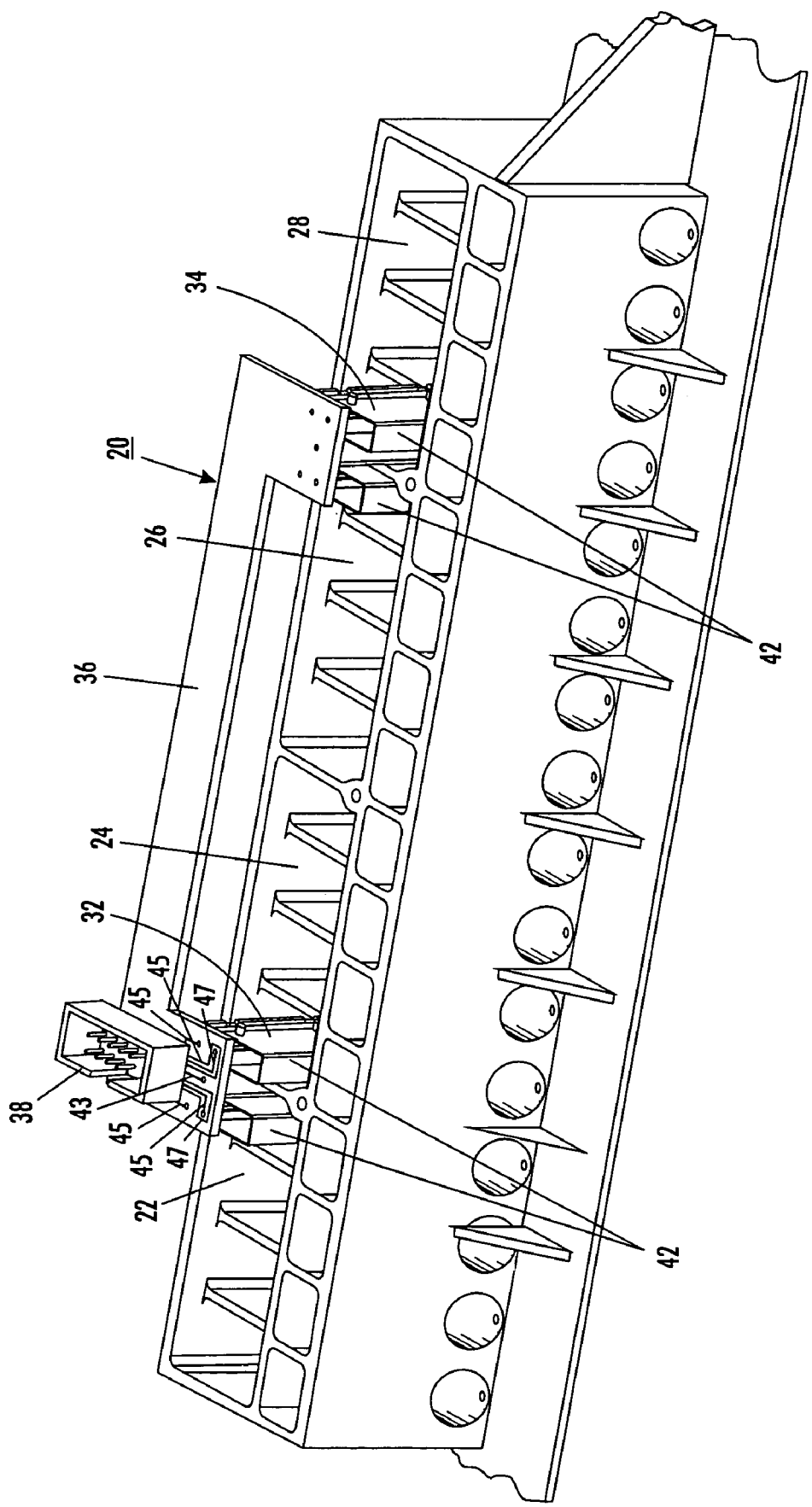
FIG. 1 is a perspective view of an ink level sensor according to an embodiment of the invention showing the sensor inserted into adjacent ink reservoirs and with electrodes shown in translucent shading.

FIG. 1 is a perspective view of ink level sensor 20 according to an embodiment of the invention. The ink level sensor 20 is shown inserted into adjacent ink reservoirs 22, 24, 26 and 28 of a printer. In the arrangement shown in FIG. 1, each of the ink reservoirs 22, 24, 26 and 28 can hold a different color of melted solid ink (see FIG. 5).

"The ink level sensor 20 is configured to measure the level of ink in each of the reservoirs 22, 24, 26 and 18 in a continuous manner. Previous ink level sensors could only detect the level of ink at designated heights when the ink cam in contact with an electrode positioned at the designated height. Adding more electrodes arrayed across the height of the reservoir was the only way to sense the ink level at varying heights. The ink level sensor 20 senses the height of the ink continuously because it measures a base line conductivity of the ink present in the reservoir with a lower probe 46 shown in FIG. 4. An upper probe 48, also shown in FIG. 4, that extends upward in the reservoir then measures a conductivity of the ink that varies as the upper probe 48 becomes covered or uncovered by ink."

The previous methods of sensing ink level can be thought of as a digital method, measuring only distinct points in the reservoir. The ink level sensor 20, in contrast, can be thought of as an analog method because the ink is measured over any continuous level of ink in a reservoir.

Figure 4:
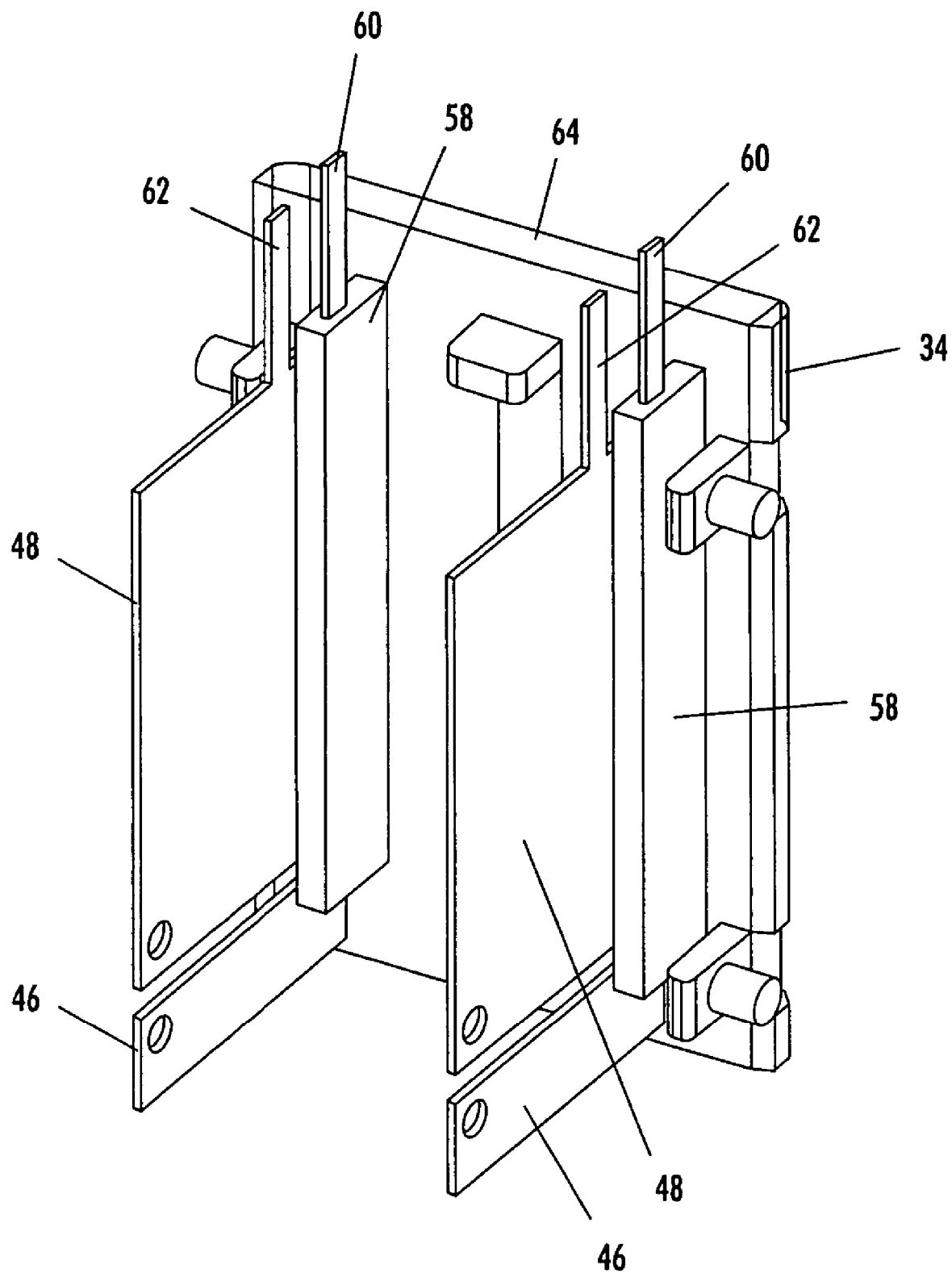
FIG. 4 is a perspective view of the probe-and-electrode portion of FIG. 3 with the electrode removed.
Figure 5:
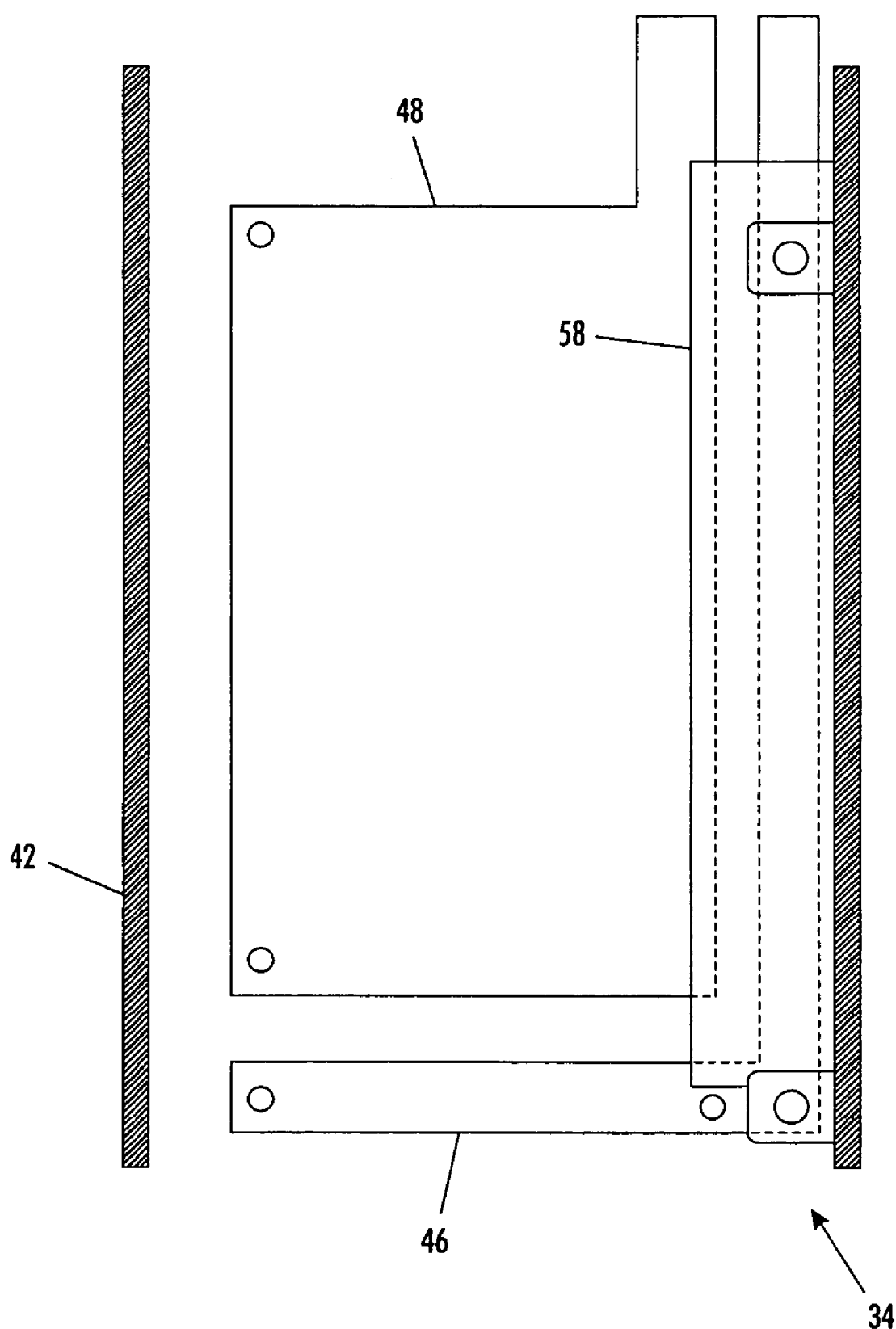
FIG. 5 is a cross-sectional view of the probe-and-electrode portion of FIG. 3 taken along line 5-5 in FIG. 3.

The ink level sensor 20 in FIG. 1 includes two probe-and-electrode portions 32, 34 that are each connected to a board 36 that both supports the probe-and-electrode portions 32, 34 and electrically connects the portions 32, 34 with a pin connector 38 utilizing electrode traces 43 embedded in the board 36 connecting the electrodes 42 of the probe-and-electrode portions 32, 34 to the pin connector 38 and probe traces 45 embedded in the board connecting each of the probes 46, 48 shown in FIGS. 4-5 with the pin connector 38. The board 36 includes ground traces 47 between the electrode traces and all of the probe traces. The ground traces shunt any leakage currents on the board 36 directly to ground such that no board leakage current flows from an electrode trace to a probe trace.

Figure 6:
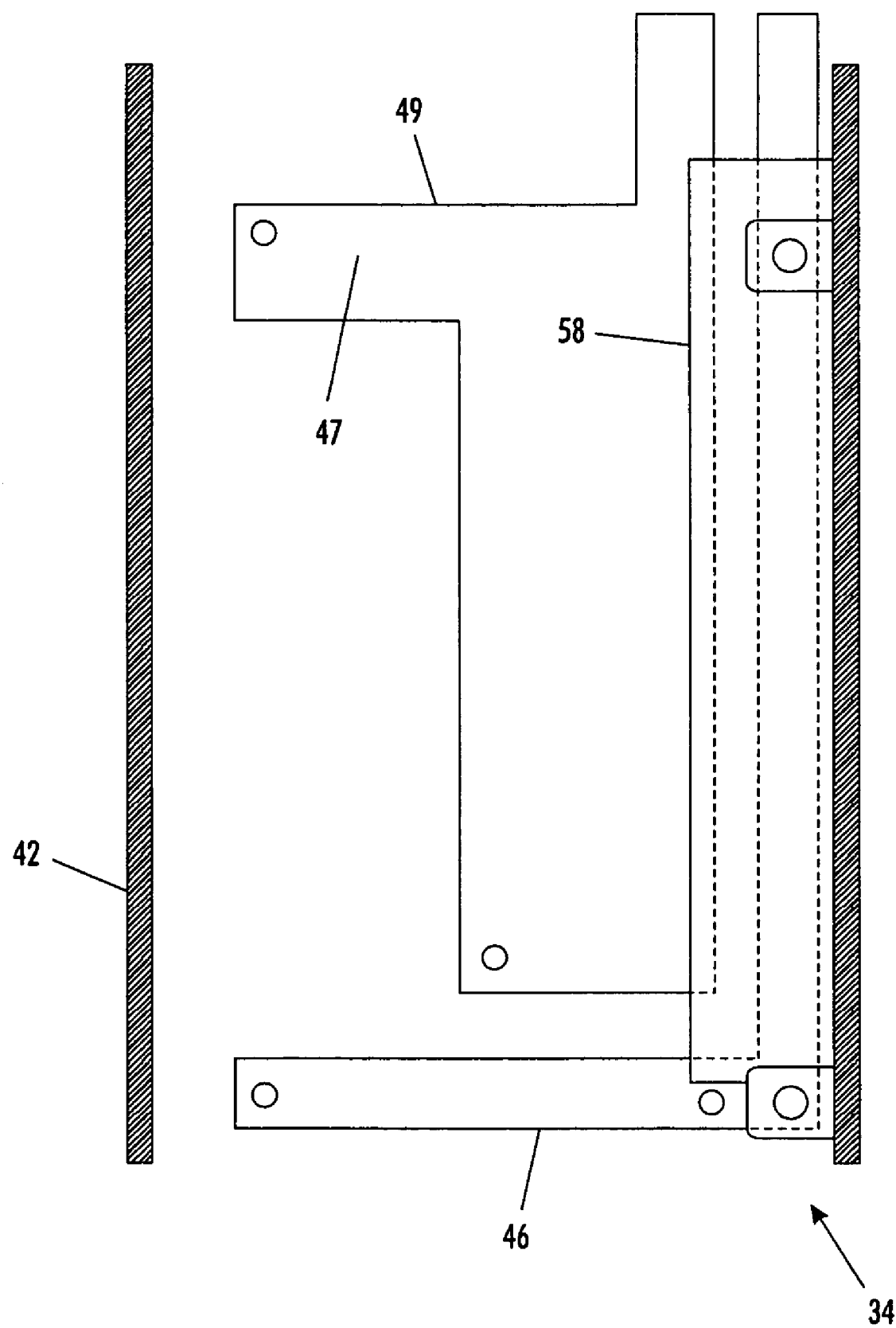
FIG. 6 is a cross-sectional view of the probe-and-electrode portion of FIG. 3 taken along line 5-5 in FIG. 3 showing an upper probe according to another embodiment of the invention.

The pin connector 38 can further connect to a controller 40 shown in FIG. 6 that is adapted to drive an AC signal to each electrode 42 and is further adapted to detect a current flow from each electrode to each of the probes 46, 48 shown in FIGS. 4-5.

Figure 2:
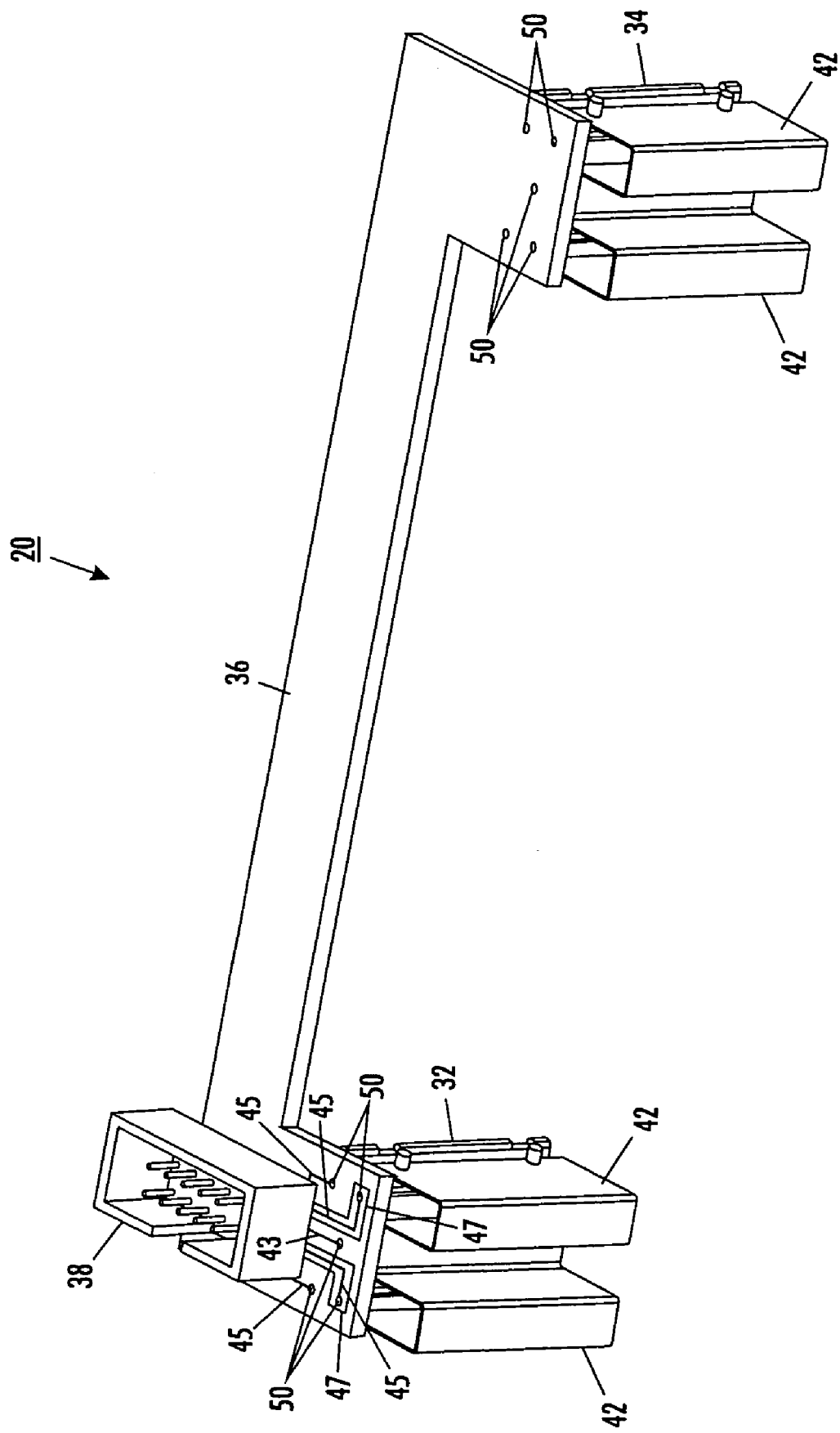
FIG. 2 is a perspective view of the ink level sensor of FIG. 1 with the electrodes shown in translucent shading.

FIG. 2 is a perspective view of the ink level sensor 20 of FIG. 1 showing the electrodes 42 mounted on board. The ink level sensor 20 includes a plurality of upper and lower probes 46, 48 shown in FIG. 4 and a plurality of corresponding electrodes 42 all arranged to be inserted in the corresponding plurality of ink reservoirs 22, 24, 26 and 28 shown in FIG. 1.

Thus, the sensing of ink levels in each of the plurality of reservoirs 22, 24, 26 and 28 is modularized into a single ink level sensing device 20. The board 36 is structured so that only five solder joints 50 are required to electrically connect to the probes 46, 48 and electrode 42 for each probe-and-electrode portion 32, 34. The solder joints 50 at each portion 32, 34 connect to two lower probes 46 and two upper probes 48 shown in FIG. 4, and one electrode 42. The electrodes 46, 48 shown in FIG. 4 are arranged to be inserted into two adjacent ink reservoirs 26, 28 as shown in FIG. 1 to sense ink level in each of the two ink reservoirs 26, 28.

Figure 3:
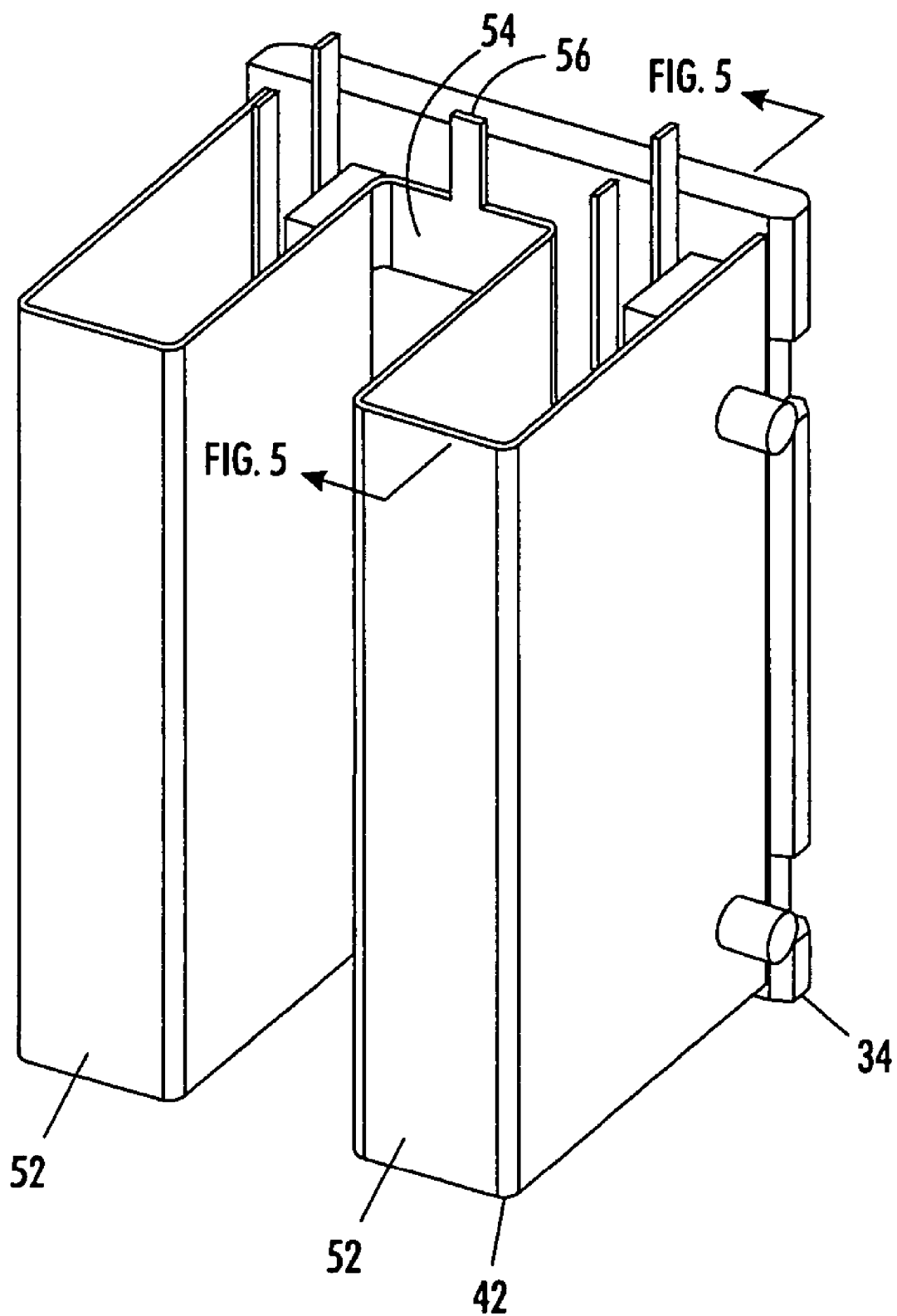
FIG. 3 is a perspective view of a probe-and-electrode portion of the ink level sensor of FIG. 2.

FIG. 3 is a detailed perspective view of probe-and-electrode portion 34 of FIG. 2. The electrode 42 is shaped to include reservoir portions 52 connected to each other across bridge portion 54. The electrode 42 electrically connects to board 36 shown in FIGS. 1-2 through tab 56 that extends upward from the bridge portion 54. This shape of the electrode 42 demonstrates a manner in which a single electrode 42 can be used in the two adjacent ink reservoirs 26, 28 in FIG. 1.

FIG. 4 is a detailed perspective view of the probe-and-electrode portion 34 of FIG. 3 with the electrode 42 removed for clarification. Lower probes 46 and upper probes 48 are mounted on insulators 58 with the insulators 58 mounted on supporting bracket 64. Tab 60 extends up from the lower probe 46 through the insulator 58 to electrically connect the lower probe 46 to the board 36 via solder joint 50 as shown in FIGS. 1-2. Tab 62 extends from the upper portion of the upper probe 48 to electrically connect the upper probe 48 to the board 36 via solder joint 50 in FIGS. 1-2.

FIG. 5 is a cross-sectional view of the probe-and-electrode portion 34 of FIG. 3 taken along line 5-5 in FIG. 3. FIG. 5 shows the spatial relationship of the lower probe 46, upper probe 48 and electrode 42. To detect the level of ink in an ink reservoir, an AC signal is driven to the electrode 42. The lower probe 46 is positioned in the lower portion of an ink reservoir. The upper probe 48 is positioned above the lower probe 46, with the upper probe 48 extending to an upper portion of the ink reservoir. The electrode 42 is positioned next to the lower probe 46 and the upper probe 48.

Figure 7:
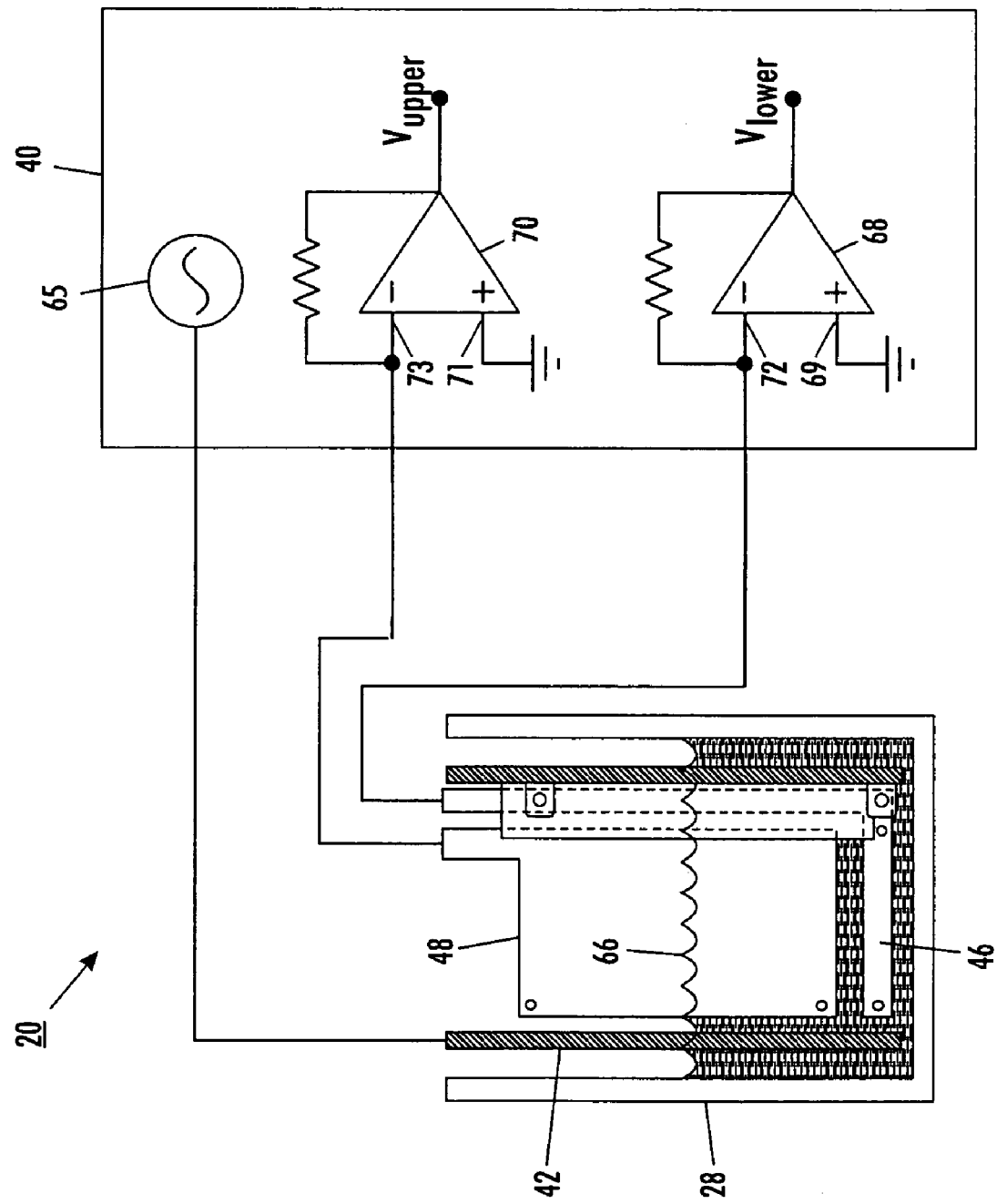
FIG. 7 is a simplified schematic and circuit diagram of a portion of the ink level sensor of FIG. 1.

Controller 40 shown in FIG. 7 detects a current flow from the electrode 42 through the ink to the lower probe 46. Controller 40 also detects a current flow from the electrode 42 through the ink to the upper probe 48. A constant current flow is detected in the lower probe 46. Varying levels of current flow are detected in the upper probe 48 as more or less of the upper probe's surface area is immersed in ink. The controller 40 compares the varying current flow in the upper probe 48 to the constant current flow of the lower probe 46 resulting in a continuous measurement of the height of ink in the ink reservoir. It must be noted that the continuous measurement is not one of discrete points.

FIG. 6 is a cross-sectional view of the probe and electrode portion 34 of FIG. 3 taken along line 5-5 in FIG. 3 showing an upper probe 49 according to another embodiment of the invention. The upper probe 49 includes wide top portion 47 that presents an increased surface area when the ink reaches the top portion 47 of the upper probe 49. The much greater surface area of top portion 47 causes an increase in current flow from the electrode 42 through the ink and upper probe 48 signaling a full reservoir condition.

FIG. 7 is a simplified schematic and circuit diagram of the ink level sensor 20 and controller 40. The ink level sensor 20 according to an embodiment of the invention measures the level of the ink 66 in reservoir 28 by comparing the conductance of the ink 66 measured by lower probe 46 and upper probe 48.

An AC signal 65 is driven by the controller 40 to electrode 42 inserted in the ink reservoir 28. The ink 66 conducts the AC signal to the lower probe 46 and to the upper probe 48.

The lower probe 46 is electrically connected to the negative input 72 of op/amp 68 in controller 40. This negative input 72 forms a virtual ground by connecting the positive input 69 of op/amp 68 to ground and also connecting the negative input 72 of op/amp 68 through a resistor to the output of op/amp 68. This virtual ground circuit eliminates any stray currents that can arise from the board 36 shown in FIGS. 1-2 or any other part of the printer body due to conductivity from the probes and associated traces and wires to electrical ground (i.e., reservoir body and other metal structures). Responsive to the current flow from the electrode 42 through the ink 66 to lower probe 46, op/amp 68 outputs a voltage $V_{lower}$ that is an expression of a conductance of the ink 66 in the reservoir 28. The conductance is measured for substantially any level of ink 66 in the reservoir 28 because the lower probe 46 is positioned near the bottom of the reservoir 28.

The upper probe 48 is electrically connected to the negative input 73 of op/amp 70 in controller 40. This negative input 73 forms a virtual ground by connecting the positive input 71 of op/amp 70 to ground and also connecting the negative input 73 of op/amp 70 through a resistor to the output of the op/amp 70. This virtual ground circuit eliminates any stray currents that can arise from the board 36 shown in FIGS. 1-2 or any other part of the printer body due to conductivity from the probes and associated traces and wires to electrical ground (i.e., reservoir body and other metal structures). Responsive to the current flow from the electrode 42 through the ink 66 to upper probe 48, op/amp 70 outputs a voltage $V_{upper}$ that is an expression of a conductance of the ink 66 contacting the surface area of the upper probe 48. As the level of the ink 66 varies in reservoir 28, that amount of surface area of upper probe 48 immersed in the ink 66 varies resulting in a varying conductance.

The controller 40 compares the variable $V_{upper}$ with the base value of $V_{lower}$. The comparison can be accomplished by connecting the outputs of the virtually grounding op/amps 68, 70 to the inputs of another op/amp (not shown) which itself would output the ratio of the voltage outputs of the op/amps 70, 68. Any other methods of comparing voltages commonly known in the art are contemplated to be within the scope of this disclosure. This comparison gives a continuous measurement of the level of ink 66 in reservoir 28. The conductance of ink varies over types of inks and even within the same type of ink at different temperatures. The two probes 46, 48 result in a comparison of two voltages outputted by virtually grounding op/amps. Thus, no matter what type of ink or what temperature the ink, a comparison of conductance is measured.

A single probe measuring the variation of conductance of varying levels of ink would not produce accurate level measurements because the conductance measured of ink at a single level in the reservoir would vary over types of inks and even vary with the same ink at differing temperatures.

Figure 8:
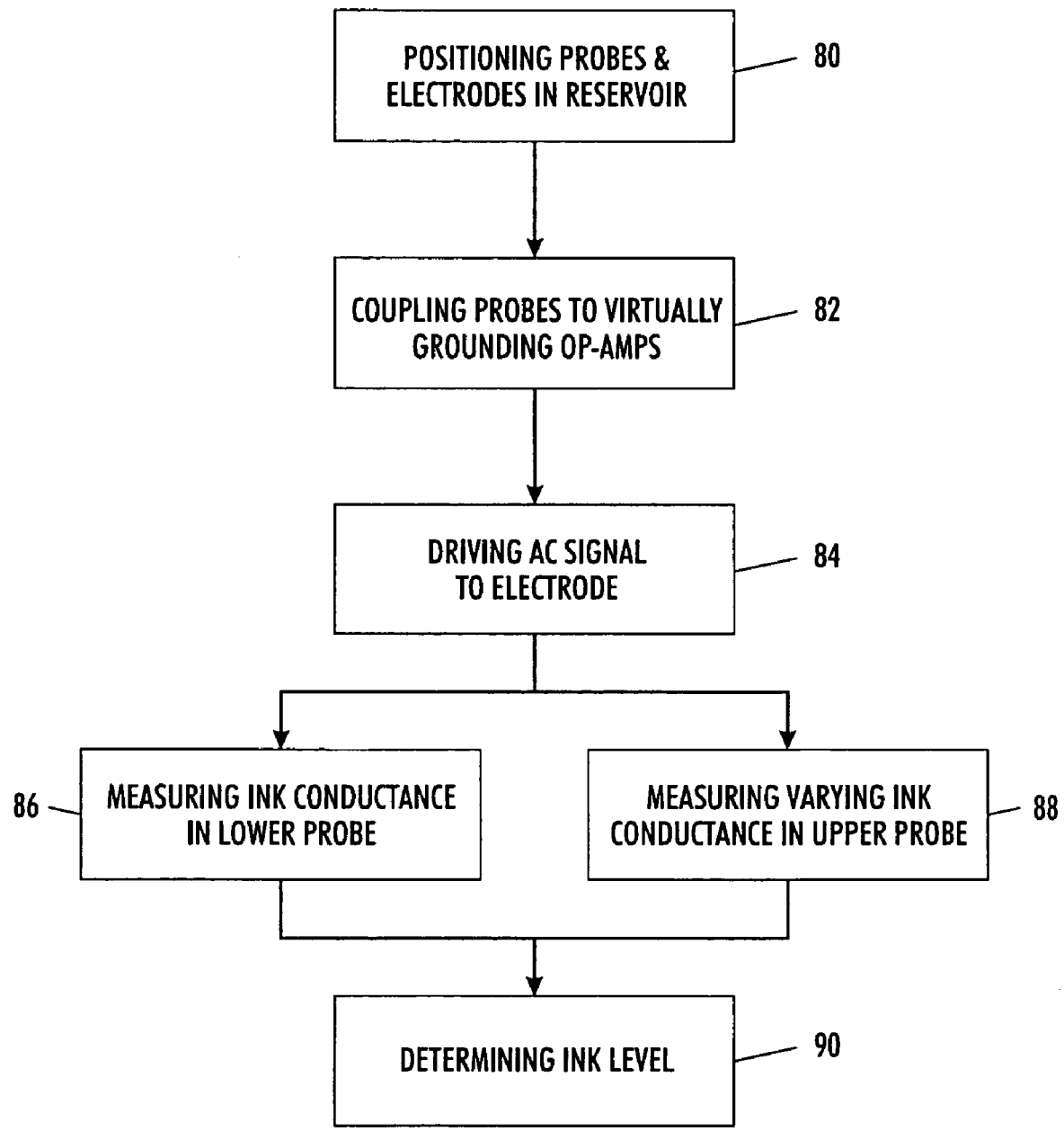
FIG. 8 is a flow chart showing a method of sensing the level of ink in a reservoir according to another embodiment of the invention.

A method of sensing the level of ink in an ink reservoir according to another embodiment of the invention will now be described by referring to FIGS. 1-7 and to FIG. 8 which is a flow chart showing aspects of the method.

At 80, the lower probe 46, upper probe 48 and electrode 42 are positioned in the ink reservoir 28. The lower probe 46 is positioned in a lower portion of the ink reservoir 66. The upper probe 48 is positioned above the lower probe 46 and extends to an upper portion of the ink reservoir 28. The electrode 42 is positioned next to the lower and upper probes 46, 48.

At 80, positioning the probes 46, 48 and electrode 42 in an ink reservoir can include positioning lower probes 46 into adjacent ink reservoirs 26 and 28 and positioning upper probes 48 above each of the lower probes 46 in each of the adjacent ink reservoirs 26 and 28. A single electrode 42 can then be positioned next the probes 46, 48 in both adjacent ink reservoirs 26 and 28.

At 82 the lower probe is coupled to a virtually grounding op-amp 68 and the upper probe 48 is coupled to another virtually grounding op-amp 70. At 84, an AC signal is driven to the electrode 42.

At 86, a conductivity of the ink 66 contacting the lower probe 46 is measured by detecting a current flow from the electrode 42 to the lower probe 46 in the lower portion of the ink reservoir 28.

At 88, a conductivity of ink 66 contacting the upper probe 48 is measured by detecting a current flow from the electrode 42 to the upper probe 48. The level of conductivity varies continuously relative to the amount of ink 66 contacting the surface area of the upper probe 48.

As an alternative, a full reservoir condition can be detected when a larger conductance is measure from an upper probe 49 shown in FIG. 6 when the upper probe 49 includes a larger upper portion 47 that presents a larger surface area at the top of the upper probe 48 for the ink 66 to contact when the ink 66 rises to that level.

At 90, the level of ink in the ink reservoir 28 is determined by comparing the detected current flows of the lower probe 46 and upper probe 48. The current flow detected from the electrode 42 to the upper probe 48 varies with the height of the ink 66. The current flow from the electrode 42 to the lower probe 46 remains constant and gives a base value from which the current flow to the upper probe 48 is compared.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An ink reservoir level sensing apparatus, comprising:
    a lower probe positioned so as to be insertable in a lower portion of an ink reservoir;
    an upper probe positioned above the lower probe and shaped to extend up to an upper portion of the ink reservoir;
    an electrode positioned next to the upper and lower probes; and
    a controller to drive an AC signal to the electrode and to detect a first constant current flow from the electrode to the lower probe and a second variable current flow from the electrode to the upper probe and compare the first and second current flows to result in a continuous measurement of a height of ink remaining in the ink reservoir.

2. The apparatus of claim 1 further comprising an electrical circuit connecting the controller to the upper and lower probes, in which the electrical circuit forms a virtual ground.

3. The apparatus of claim 2, in which the electrical circuit includes a first op-amp configured to act as a virtual ground electrically connected to the lower probe and a second op-amp configured to act as a virtual ground electrically connected to the upper probe.

4. The apparatus of claim 1, in which:
    the lower probe includes a plurality of lower probes arranged to be positioned in a lower portion of a corresponding plurality of ink reservoirs;
    the upper probe includes a corresponding plurality of upper probes arranged to be positioned above each corresponding plurality of lower probes and shaped to extend to an upper portion of each corresponding ink reservoir;
    the electrode includes a plurality of electrodes arranged to be positioned next to the upper and lower probe in each ink reservoir;
    the controller is further to drive an AC signal to each electrode; and
    the controller is further to detect a current flow from the electrode to the upper and lower probes in each ink reservoir.

5. The apparatus of claim 4, further comprising a board that supports the plurality of lower probes, upper probes and electrodes and electrically connects the plurality of lower probes, upper probes and electrodes to the controller with probe traces and electrode traces.

6. The apparatus of claim 5, in which the board includes ground traces between electrode traces and all probe traces.

7. The apparatus of claim 5, in which the board includes five solder joints that electrically connect lower probes, upper probes and electrodes that are arranged to sense ink level in two adjacent ink reservoirs.

8. The apparatus of claim 4, in which a single electrode is positioned next to lower probes and upper probes arranged to sense ink level in two adjacent ink reservoirs.

9. The apparatus of claim 1 in which the upper probe includes an upper portion extending wider than a main portion.

10. A method of sensing a level of ink in a reservoir, comprising;
    positioning a lower probe in a lower portion of the reservoir;
    positioning an upper probe in the reservoir above the lower probe extending to an upper portion of the reservoir;
    positioning an electrode in the reservoir next to the lower and upper probes;
    driving an electrical signal to the electrode;
    detecting a first current flow from the electrode to the lower probe;
    detecting a second current flow from the electrode to the upper probe, in which the second current flow varies continuously relative to a level of ink in the reservoir; and
    determining a level of ink in the reservoir by comparing the first and second current flows.

11. The method of claim 10, in which detecting a first current flow from the electrode to the lower probe includes measuring a conductivity of ink in the lower portion of the reservoir.

12. The method of claim 11, in which detecting a second current flow from the electrode to the upper probe includes measuring a conductivity of ink contacting the upper probe wherein the level of conductivity varies continuously relative to an amount of ink contacting the upper probe.

13. The method of claim 12, in which measuring a conductivity of ink contacting the upper probe includes measuring a larger conductivity when the ink contacts a wider upper portion of the upper probe.

14. The method of claim 10, in which positioning a lower probe in a lower portion of the reservoir includes positioning a lower probe into each of two adjacent reservoirs; positioning an upper probe in the reservoir above the lower probe extending to an upper portion of the reservoir includes positioning an upper probe above each of the lower probes in the two adjacent reservoirs; and positioning an electrode in the reservoir next to the lower and upper probes includes positioning a single electrode next to the lower and upper probes in the two adjacent reservoirs.

15. The method of claim 10, in which further comprising coupling the lower and upper probes to a virtual ground.

16. The method of claim 15, further comprising coupling the lower probe to a first op-amp configured to act as a virtual ground and coupling the upper probe to a second op-amp configured to act as a virtual ground.

17. An ink reservoir level sensing apparatus, comprising:

a plurality of lower probes arranged to be positioned so as to be insertable in a lower portion of a corresponding plurality of ink reservoirs;

a plurality of upper probes arranged to be positioned above each corresponding plurality of lower probes and shaped to extend to an upper portion of each corresponding ink reservoir;

a plurality of electrodes arranged to be positioned next to the upper and lower probe in each ink reservoir such that a single electrode is positioned next to lower probes and upper probes arranged to sense ink level in two adjacent ink reservoirs; and a controller to drive an AC signal to each electrode and to detect a constant current flow from the electrodes to the upper and lower probes in each reservoir to result in a continuous measurement of a height of ink remaining in the ink reservoir.

* * * * *